Figure 1:
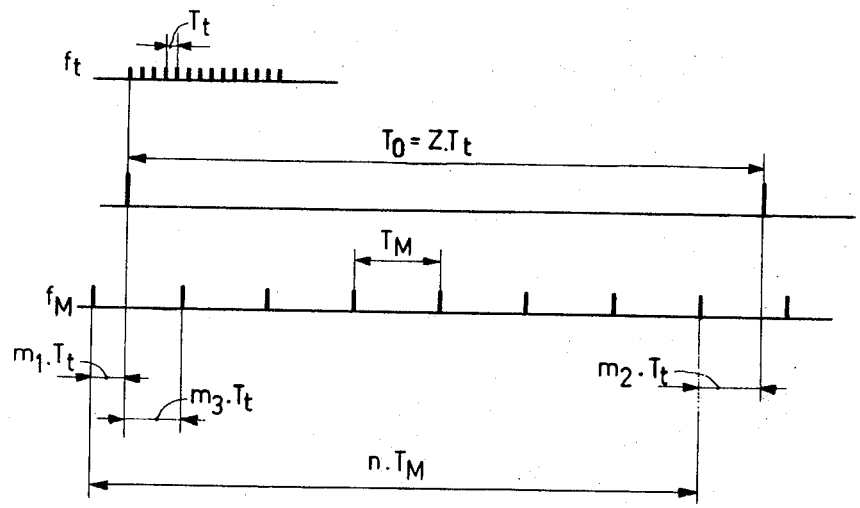

United States Patent [19]

Schroder et al.

[11] 3,829,785
[45] Aug. 13, 1974

[54] CIRCUIT ARRANGEMENT FOR DIGITAL FREQUENCY MEASUREMENT

[75] Inventors: Gerd Schroder; Dietrich Meyer-Ebrecht, both of Hamburg, Germany

[73] Assignee: U.S. Philips Corporation, New York, N.Y.

[22] Filed: Apr. 25, 1973

[21] Appl. No.: 354,395

[30] Foreign Application Priority Data
Apr. 28, 1972    Germany............................ 2220878

[52] U.S. Cl................. 328/130, 324/78 D, 328/140
[51] Int. Cl............................................. G01r 23/00
[58] Field of Search ........... 328/129, 130, 133, 140; 324/78 D

[56] References Cited
UNITED STATES PATENTS 3,651,414    3/1972    Jamieson ......................... 328/130 X
3,725,794    4/1973    Asplund........................... 328/130 X

*Primary Examiner*—John S. Heyman
*Attorney, Agent, or Firm*—Frank R. Trifari; Simon L. Cohen

[57] ABSTRACT

For the measurement of the unknown frequency or period of a measuring signal within a given measuring time interval the number of full cycles of the measuring signal within the measuring time interval are counted in a first group of counting circuits and the fractions of the measuring signal cycles at the beginning and at the end of the measuring time interval are counted with the aid of a clock pulse train of fixed frequency in a second group of counting circuits. For a measuring signal of high frequency, the capacity of the first group should be large, whereas that of the second group need only be small, because the fractions at the beginning and at the end of the measuring time interval are correspondingly small. For a measuring signal of low frequency this is just the other way round, so that the total number of counting circuits is independent of the frequency and is only determined by the required resolution. When these counting circuits are divided into groups in accordance with the frequency of the measuring signal, the required number of counting circuits can be substantially reduced. In order to ensure that the values for determining the unknown frequency are obtained within the measuring time interval only, the counting circuits may be divided into three groups, so that the subsequent computing equipment may also be reduced considerably.

9 Claims, 4 Drawing Figures

CIRCUIT ARRANGEMENT FOR DIGITAL FREQUENCY MEASUREMENT

The invention relates to a circuit arrangement for the digital measurement of the frequency and period of a measuring signal within a measuring time interval with the aid of a chain of counting circuits and an arithmetic unit connected to the outputs thereof, using a clock pulse train the frequency of which is determined by the required resolution.

Such a circuit arrangement is used in a known apparatus. It enables the problem to be overcome which occurs when the measuring time interval is so short that at the lowest frequency to be measured only a few cycles of the measuring signal fall within the measuring time interval, so that the required resolution cannot be obtained by merely counting the cycles of the measuring signal within the measuring time interval. In this case the frequency is to be determined by measuring the periods. The highest degree of accuracy of such a measurment is attained by averaging over all the cycles occurring within the measuring time interval. To this end the known circuit arrangement utilizes two counters, i.e. one for counting all the cycles of the measuring signal which fall within the measuring time interval and one for counting those cycles at a high clock frequency, so that the fraction of the last cycle of the measuring signal is also included. The frequency of the measuring signal is then automatically computed from the two counting results at the end of the measuring time interval. If widely differing frequencies are to be measured, the two counters must have a counting capacity which is in accordance with the required resolution.

However, this demands a large number of counting circuits. Moreover, the measuring values are not yet available at the end of the given measuring time interval, because the actual measuring process does not commence until the first full cycle of the measuring signal after the beginning of the measuring time interval. This particularly unfavourable in multiplexed frequency-analogue measuring systems, where the measuring time intervals should directly follow each other.

It is an object of the invention to enable the complete digital measurement of the frequency of a measuring signal to be carried out within a measuring time interval using a small number of counting circuits. According to the invention this is achieved in that a first group of the chain of counting circuits, which is to be divided into at least two groups, counts the clock pulses. Each pulse of the pulse-shaped measuring signal resets said first group of counting circuits to an initial state. A second group of counting circuits counts the pulses of the measuring signal. The pulses which limit the measuring time interval reset said second group of counting circuits to an initial state, while the arithmetic unit calculates the frequency $f_M$ and period $T_M$ of the measuring signal from the counts $m_1$ and $m_2$ of the counting circuits of the first group at the beginning and at the end respectively of the measuring time interval, from the count $n$ of the counting circuits of the second group at the end of the measuring time interval and from the given number of $z$ clock pulses within the measuring time interval and the clock-pulse frequency $f_t$ in accordance with the equation:

$$f_M = 1/T_M = n/z + m_1 - m_2 \cdot f_t.$$

This is based on the recognition that at a high frequency of measuring signal many cycles of the measuring signal fall within the measuring time interval so that the corresponding group of the counting circuits is required to be large, but that in this case less clock pulses will occur during the cycle fractions of the measuring signal at the beginning and at the end of the measuring time interval. Conversely, for a measuring signal of low frequency the first group of counting circuits need only be small, because only a few cycles of the measuring signal fall within the measuring time interval; however, a greater number of clock pulses may occur in the fractions of the measuring cycles at the beginning and at the end of the measuring time interval, so that the second group of counting circuits should now be larger. The total number of counting circuits required, however, is independent of the frequency of the measuring signal. Thus, when the chain of counting circuits is divided into groups in accordance with the required counting capacities of the groups of counting circuits, which are determined by the anticipated frequency range of the measuring signal, these are utilized in an optimum manner. Thus, the frequency measurement can be performed using a minimum of equipment. Moreover, this ensures that all measuring data is available at the end of the given measuring time interval.

However, in some cases it is inconvenient that the one count of the first group of counting circuits is formed in a period of time prior to the actual measuring time interval. When, for example, a number of frequency-analogue measuring channels are to be scanned consecutively, switching over to the next measuring channel being effected upon each pulse which limits the measuring time interval, the count of the first group of counting circuits is not readily available at the beginning of the measuring time interval. A further development of the theory on which the invention is based, in which all the measuring quantities required for computing the frequency of the measuring signal are produced within the measuring time interval, is therefore characterized in that the chain of counting circuits can be divided into three groups, that each pulse which limits the measuring time interval resets the third group of counting circuits, that said third group of counting circuits counts the pulses of the clock signal, starting from each pulse which limits the measuring time interval to the first subsequently appearing pulse of the measuring signal. The count of said third group of counting circuits when attained represents the initial count of the first group of counting circuits. While the value which is applied to the arithmetic unit and which represents the count of the first group of counting circuits at the beginning of measuring time interval is zero. Accordingly the fractions of the measuring cycles at the beginning and at the end of the measuring time interval which fall within said interval are measured by counting, the resulting counts being added to one another. Thus, the calculation of the frequency of the measuring signal only requires the difference to be established between the given number of clock pulses and the count of the first group of counting circuits. This subtraction may even be avoided when the initial state of the third group of counting circuits is made to correspond to the given number of clock pulses within the measuring time interval and the first and the third group of counting circuits count backwards. The difference is then obtained by counting backwards.

Figure 2:
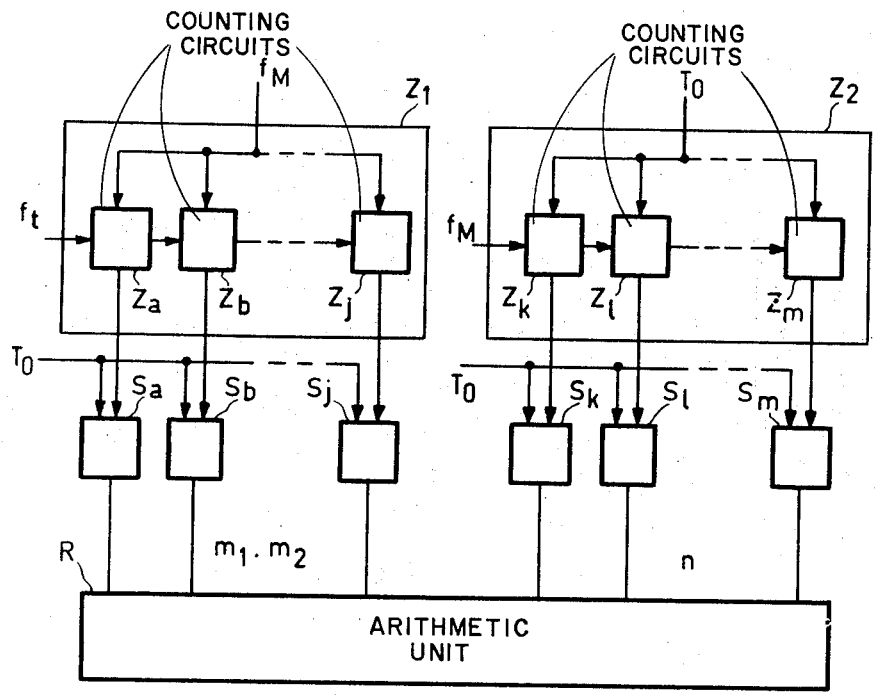
Figure 3:
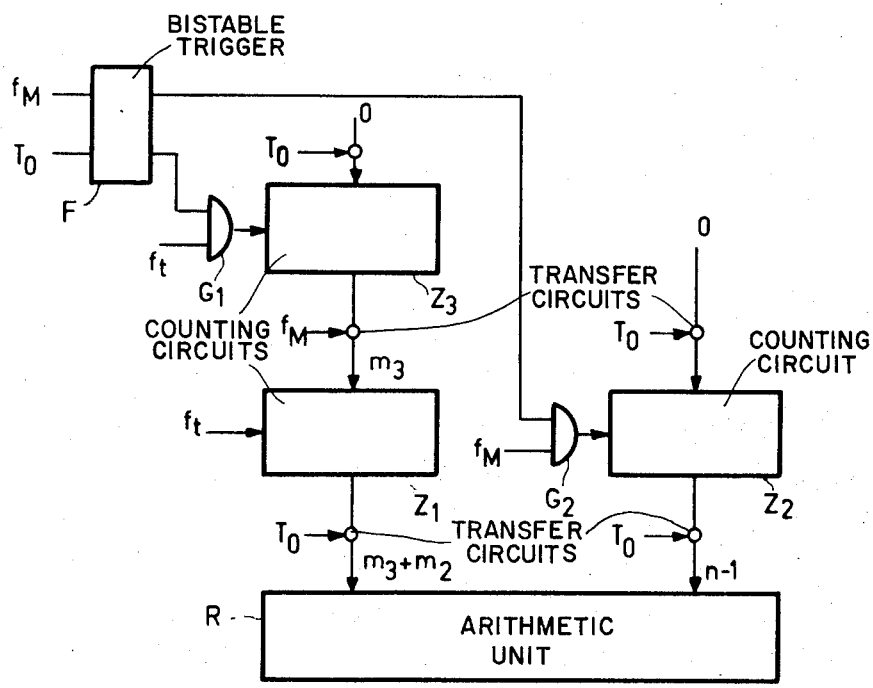
Figure 4:
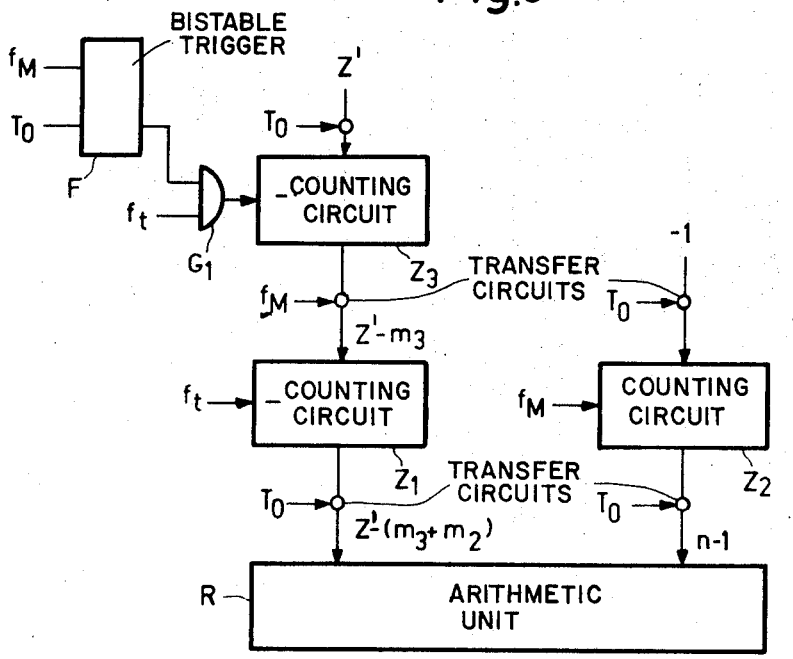

The invention will be described in more detail, with reference to the accompanying drawings, in which:

FIG. 1 is a time diagram illustrating the operation of the circuit according to the invention, FIG. 2 shows a chain of counting circuits according to the invention which is divided into two groups and the control thereof, and FIGS. 3 and 4 show two examples of the control system in the case of a subdivision into three groups of counting circuits.

In FIG. 1, $f_t$ represents the clock pulse train, the individual clock pulses having a mutual spacing $T_t$. This pulse spacing is the reciprocal of the frequency of the clock pulse train, which for the sake of convenience is also denoted by $f_t$. The pulses shown on the second line limit the measuring time interval $T_0$, the duration of which is determined by the frequency of the clock pulse train or by the clock pulse spacing $T_t$ and by the required resolution $z$, as is shown in FIG. 1.

At $f_M$ an example is given of a pulse-shaped measuring signal, which has a frequency $f_M$ or a period $T_M$, such that in the measuring time interval $T_0$ a number of whole measuring signal cycles occur and that both at the beginning and at the end of a fraction of a measuring signal cycle occurs. When these fractions of measuring signal cycles are expressed by multiples $m_1$ and $m_2$ respectively for the clock pulse cycle $T_t$, as is shown in FIG. 1, the equation given below follows from the given time relation:

$$z \cdot T_t + m_1 \cdot T_t - m_2 \cdot T_t = n \cdot T_M$$

As the pulse cycles are the reciprocals of the corresponding frequencies, this directly yields the equation given hereinbefore:

$$f_M = 1/T_M = n/z + m_1 - m_2 \cdot f_t$$

In this equation $n$ is the number of measuring signal cycles from the last pulse of the measuring signal before the measuring time interval until the last pulse within the measuring time interval. This necessarily equals the number of pulses of the measuring signal within the measuring time interval.

Consequently, the unknown frequency $f_M$ of the measuring signal can be derived from the numbers of pulses, which can be determined with the aid of counting circuits. An example of such a circuit arrangement is shown in FIG. 2. In this Figure a chain of counting circuits Z is divided into two groups $Z_1$ and $Z_2$, the first group comprising the counting circuits $Z_a$ to $Z_j$ and the second group comprising the counting circuits $Z_k$ to $Z_m$. For the first group $Z_1$ the clock pulse train $f_t$ is applied as a clock signal for advancing the counting circuits, which for example are combined to form a binary counter. All the counting circuits $Z_a$ to $Z_j$ are reset to the initial state by a pulse of the measuring signal $f_M$.

When, for example bistable trigger circuits are used as counting circuits, this initial state is determined by the side of the relevant trigger circuit to which the reset signal is applied. A pulse which defines the measuring time interval $T_0$ is applied to a line which for convenience is also designated $T_0$, and transfers the output signals of the counting circuits $Z_a$ to $Z_j$ to the arithmetic unit R. These output signals represent the coded numbers of clock pulses $m_1$ and $m_2$ respectively. The output signals are transferred with the aid of the circuits $S_a$ to $S_j$, which may have a storage function, for example when the arithmetic unit does not include a store and the computation of the frequency of the measuring signal requires, for example, a time which is appreciably longer than the duration of a clock-pulse cycle.

The second group of counting circuits $Z_2$ is arranged in a similar way, the pulses of the measuring signal $f_M$ being used for counting purposes and the pulses which limit the measuring time interval $T_0$ being used as reset signals. The output signals of the counting circuits $Z_k$ to $Z_m$ are transferred by the same signal as in the first group of counting circuits $Z_1$. These output signals represent the number of measuring signal pulses within the measuring time interval in coded form. It is true that the second group of counting circuits $Z_2$ is reset to the initial state by the same signal by which the output signals are transferred to the arithmetic unit, but this problem can readily obviated, by using dynamic "AND" gates or trigger circuits with a preparatory and a command input for the circuits $S_k$ to $S_m$.

If possible, the number $z$, which should at least equal the required resolution, is laid down in the computer R by means of appropriate wiring so that an arithmetic circuit os simple design is obtained. The frequency $f_t$ of the clock pulse train is also suitably selected.

As appears form FIG. 1, the value $m_1$ used for the computation is generated prior to the beginning of the measuring time interval $T_0$. However, if this value cannot be attained, as stated in the preamble, the fraction of the measuring signal cycle at the beginning of the measuring time interval should also be obtained within said measuring time interval. According to FIG. 1, this fraction may comprise a number of $m_3$ clock pulse cycles $T_t$. The computation of the unknown frequency $f_M$ of the measuring signal should then be based on one measuring-signal cycle less, so that the following equation follows from FIG. 1:

$$Z \cdot T_t - (m_3 \cdot T_t + m_2 \cdot T_t) = (n - 1) \cdot T_M$$

The value $m_3$ representing the fraction of the signal cycle at the beginning of the measuring time interval may either be stored temporarily or may be transferred to a further group of counting circuits which is obtained by dividing the chain of counting circuits into three groups. This yields some additional advantages, which will discussed in more detail with reference to further embodiments.

The circuit diagram of FIG. 3 no longer shows the individual counting circuits, but only the groups of counting circuits $Z_1$, $Z_2$ and $Z_3$. For simplicity, the large number of output lines of the group of counting circuits is also represented by one line only and the group of circuits for transferring the output signals is represented by a small circle to which the command signal is laterally applied.

The operation of the circuit with respect to the two groups $Z_1$ and $Z_2$ is almost the same as that of the circuit according to FIG. 1. Furthermore, a third group of counting circuits $Z_3$, two logic gates $G_1$ and $G_2$ and a bistable trigger circuit F are provided.

A pulse which limits the measuring time interval $T_0$ is applied to the correspondingly designated lines in FIG. 3. By this pulse as in the preceding case, the group of counting circuits $Z_2$ is reset to zero, which for clarity is indicated in a corresponding manner. Moreover, the group of counting circuits $Z_3$ is reset to zero, and of the bistable trigger circuit F the lower output is enabled and the upper output is inhibited. Subsequently, the AND-gate $G_1$ is enabled, thus permitting the group $Z_3$ to count the clock pulse train $f_t$. To begin with AND-gate $G_2$ is inhibited, so that no counting signals are applied to the clock input of the group $Z_2$. When the first pulse of the measuring signal $f_M$ after the beginning of the measuring time interval appears, the bistable trigger circuit F is set to the other state, thus enabling the AND-gate $G_2$, so that the group $Z_2$ can count the subsequent pulses of the measuring signal $F_M$. As a result the first pulse of the measuring signal within the measuring time interval is suppressed, so that the count of this group $Z_2$ at the end of the measuring time interval is $n - 1$, as is indicated by the last-mentioned equation.

Moreover, the AND-gate $G_1$ is inhibited as a result of the bistable trigger stage F changing over, so that the counting group $Z_3$ no longer receives any counting clock pulses and remains in the state just reached, which corresponds to the value $m_3$, as appears from FIG. 1. Moreover, this position is transferred to the counting group $Z_1$ as initial value by this pulse and all the subsequent pulses of the measuring signal, as is indicated in FIG. 3. This counter group thus adds the clock pulses to this initial value $m_3$ in each measuring time interval $T_m$.

Upon the next pulse which limits the measuring time interval $T_0$ and thus indicates the end of this interval, the counts of the counter groups $Z_1$ and $Z_2$ are transferred to the arithmetic unit R, as is shown in FIG. 3. A comparison with the time intervals of FIG. 1 reveals that the counter group $Z_1$ contains the sum $m_3 + m_2$ at this instant and that the counter group $Z_2$ contains the number of measuring signal pulses within the measuring time interval reduced by 1. Consequently, these computations need not be performed in the arithmetic unit R.

Another possibility of further reducing the computing equipment is by means of the circuit arrangement according to FIG. 4. The presentation and the meaning of the symbols in the same as for FIG. 3.

In the circuit the counter group $Z_2$ is set to the $-1$ state at the beginning of the measuring time interval and receives all the pulses of the measuring signal $f_M$ within the measuring time interval as counting clock pulses, so that at the end of the measuring time interval the counter group is in the same state as the corresponding counter group in FIG. 3. However, at the beginning of the measuring time interval the counter group $Z_3$ is set to a state $z^1$ which corresponds to the number $z$ of the clock pulses. At the beginning of the measuring time interval the counting group $Z_3$ receives the counting clock pulse train $f_t$ via the AND-gate $G_1$, which is controlled by the bistable trigger circuit F in the same way as in FIG. 3, but which now causes the counting circuits to count backwards from the initial position, which is indicated by a minus sign near the counting clock pulse input. As a result, this counter group $Z_3$ is in state $z' - m_3$ upon the appearance of the first pulse of the measuring signal within the measuring time interval. The state is then transferred upon each pulse of the measuring signal to the counter group $Z_1$ as initial state. In this counter group $Z_1$ the clock pulse train $f_t$ is also counted backwards, which again is indicated minus sign near the counting clock input.

At the end of the measuring time interval $T_0$ the pulse which limits this interval transfers the count $z' - (m_3 + m_2)$ from the counter group $Z_1$ to the arithmetic unit R, which directly generates the divisor for the calculation of the unknown frequency of the measuring signal.

Essentially, the arithmetic unit is therefore only required to perform the division and may therefore be of a simple design. The division of the chain of counting circuits into groups can be realized in many different ways. The inputs and outputs of the individual counting circuits may, for example, be connected to switching contacts, or they are connected to logic gates which are controlled by switches. By means of these switches for example the clock inputs are the changed over form the clock pulse train to the measuring signal and the set inputs are connected to the corresponding signal. The setting of the switches and thus the counting capacity of the individual groups should be in accordance with the anticipated frequency range of the measuring signal. However, the division may also take place with the aid of the measuring signal itself. For example the first counting circuits of the chain are in principle controlled by the clock pulse train and the second group of counting circuits is started by the counting circuit which is no longer influenced by the counting of the clock pulses between two pulses of the signal, while the provision of a further counting circuit may be considered as a safety margin for statistical fluctuations. In this case it is no longer necessary to know at least the approximate range of the anticipated frequency of the measuring signal prior to the measurement.

We claim:

1. A circuit arrangement for determining the frequency or period of a pulsatory measuring signal, comprising means for receiving a clock pulse signal having a frequency considerably higher than the measuring signal frequency, means for receiving a pulsed measuring time interval signal having a frequency lower than said measuring signal frequency and equal to a submultiple of said clock pulse signal frequency, a first chain of counting circuits connected to said means for receiving the clock pulse signal for counting said clock pulse signal, means connected to said means for receiving the measuring signal and to the first chain of counting circuits for setting initial conditions into said counting circuits in response to each measuring signal pulse, a second chain of counting circuits connected to said means for receiving said measuring signal for counting the pulses of said measuring signal, means connected to said means for receiving the measuring time interval signal and to the second chain of counting circuits for setting initial conditions into said second chain of counting circuits in response to each measuring time interval pulse, signal transfer means for providing on a plurality of output lines the contents of the first and second chains of counting circuits in response to said measuring time interval signal, and arithmetic means connected to the output lines of said signal transfer means for dividing a numerical quantity equal to the number of counting circuits in said second chain of counting circuits by the sum of the number of clock pulses between measuring time intervals and the difference between two succeeding transferred outputs of the first chain of counting circuits and for multiplying the result of the division by the clock pulse frequency.

2. A circuit arrangement as claimed in claim 1, characterized in that the arithmetic unit (R) is preceded by a store ($S_a \ldots S_m$) which stores the transferred counts of the counting circuits ($Z_a \ldots Z_m$).

3. A circuit arrangement as claimed in claim 1, characterized in that the initial condition of the two groups of counting circuits is zero.

4. A circuit arrangement as claimed in claim 1 further comprising a third chain of counting circuits, means connected to the means for receiving the measuring time interval signal and to the third group ($Z_n \ldots Z_t$) of counting circuits for resetting the third group of counting circuits to an initial state; trigger means connected to said means for receiving said measuring time interval signal and said measuring signal for producing a control signal that is initiated in response to a pulse of said measuring time interval signal and ends in response to a pulse of said measuring signal, gate means for providing said clock signal to said third chain of counting circuits in response to said control signal, means for setting initial conditions into said third chain of counting circuits in response to each measuring time interval pulse, said third group of counting circuits thereby counting the number of pulses of the clock signal ($f_t$) between each pulse which limits the measuring time interval ($T_0$) and the first subsequently appearing pulse of the measuring signal ($f_M$); and the third group of counting circuits comprising the means for setting initial conditions into said first chain of counting circuits whereby the count $m_3$ of said third chain of counting circuits which is then reached indicates the initial state of the first group ($Z_a \ldots Z_j$) of counting circuits.

5. A circuit arrangement as claimed in claim 4, characterized in that the initial state of the third group ($Z_n \ldots Z_t$) of counting circuits corresponds to the given number of $z$ clock pulses within the measuring time interval ($T_0$), and that the first ($Z_a \ldots Z_j$) and the third group ($Z_n \ldots Z_t$) of counting circuits count backwards.

6. A circuit arrangement as claimed in claim 4, characterized in that the initial state of the second group ($Z_k \ldots Z_n$) of counting circuits is $-1$.

7. A circuit arrangement as claimed in claim 4, characterized in that the initial state of the second group ($Z_k \ldots Z_m$) of counting circuits is zero, further comprising the first means for suppressing pulse of the measuring signal ($f_M$) which appears after the pulse which limits the measuring time interval ($T_0$).

8. A circuit arrangement as claimed in claim 1, characterized in that the division of the chain of counting circuits into groups depends upon the counting capacities of the groups of counting circuits which are required by the anticipated frequency range of the measuring signal ($f_M$).

9. A circuit arrangement as claimed in claim 8, characterized in that the subdivision of the chain into groups is controlled automatically in accordance with the measuring signal ($f_M$).

* * * * *

UNITED STATES PATENT OFFICE
CERTIFICATE OF CORRECTION

Patent No. 3,829,785            Dated August 13, 1974

Inventor(s) Gerd Schroder and Dietrich Meyer-Ebrecht

It is certified that error appears in the above-identified patent and that said Letters Patent are hereby corrected as shown below:

ON THE TITLE PAGE

"[30]     Foreign Application Priority Data

Apr. 28, 1972      Germany................2220878"

should read:

--[30]     Foreign Application Priority Data

Apr. 28, 1972      Germany................P.2220878.2--;

UNITED STATES PATENT OFFICE
CERTIFICATE OF CORRECTION

Patent No. 3,829,785           Dated August 13, 1974

Inventor(s) Gerd Schroder and Dietrich Meyer-Ebrecht

It is certified that error appears in the above-identified patent and that said Letters Patent are hereby corrected as shown below:

IN THE SPECIFICATION

Col. 1, line 21, "measurment" should be --measurement--;

line 65, "$f_M = 1/T_M = n/z + m_1 - m_2 \cdot f_t.$" should read:

$$f_M = \frac{1}{T_M} = \frac{n}{z + m_1 - m_2} \cdot f_t.\text{--;}$$

Col. 2, line 1, after "of" first occurence insert --the--;

line 49, "when" should be --then--;

line 50, ". While" should be --while--;

Col. 3, line 36, "$f_M = 1/T_M = n/z + m_1 - m_2 \cdot f_t.$" should read:

$$\text{--}f_M = \frac{1}{T_M} = \frac{n}{z + m_1 - m_2} \cdot f_t.\text{--;}$$

Signed and sealed this 31st day of December 1974.

(SEAL)
Attest:

McCOY M. GIBSON JR.           C. MARSHALL DANN
Attesting Officer              Commissioner of Patents